United States Patent [19]
Kittmann et al.

[11] Patent Number: 5,724,709
[45] Date of Patent: Mar. 10, 1998

[54] EXPANSION ANCHOR WITH POSITIONING PROJECTION AND STOPPER MEMBER

[75] Inventors: Roland Kittmann, Reichertshausen; Alfred Gürtler, Feldkirchen, both of Germany

[73] Assignee: Panduit GmbH, Bad Homburg v.d.H, Germany

[21] Appl. No.: 500,084

[22] Filed: Jul. 10, 1995

[30] Foreign Application Priority Data

Jul. 9, 1994 [DE] Germany .................. 94 11 165.0 U

[51] Int. Cl.[6] ............................................... A44B 17/00
[52] U.S. Cl. ........................ 24/453; 411/508; 24/297
[58] Field of Search .......................... 411/508; 24/543, 24/297, 289, 453

[56] References Cited

U.S. PATENT DOCUMENTS

| | | | |
|---|---|---|---|
| 3,776,092 | 12/1973 | Seckerson . | |
| 3,909,883 | 10/1975 | Fegen . | |
| 4,422,222 | 12/1983 | Notoya | 24/297 X |
| 4,470,178 | 9/1984 | Matsui | 24/289 |
| 4,635,326 | 1/1987 | Yagi | 24/297 X |
| 4,917,340 | 4/1990 | Juemann et al. | 24/543 X |
| 4,927,287 | 5/1990 | Ohkawa et al. | 24/297 X |
| 5,011,356 | 4/1991 | Fernandez | 24/297 X |
| 5,046,223 | 9/1991 | Kraus | 24/297 X |
| 5,143,500 | 9/1992 | Schuring et al. | 411/508 X |
| 5,191,513 | 3/1993 | Sugiura et al. | 411/508 X |
| 5,217,337 | 6/1993 | Junemann et al. | 411/508 X |

FOREIGN PATENT DOCUMENTS 2 031 485   1/1971   Germany .

*Primary Examiner*—Peter M. Cuomo
*Assistant Examiner*—Stephen Vu
*Attorney, Agent, or Firm*—Wenderoth, Lind & Ponack

[57] ABSTRACT

An expansion anchor to be anchored in a hole of one member to connect thereto another member includes a head to abut a surface of the one member. A shaft extends from the head to be inserted through the hole in the one member. The shaft has extending therefrom fins that are deflectable toward the shaft upon insertion of the fins with the shaft into a hole and that are resiliently expandable away from the shaft when the fins have passed through the hole. Thus, the fins abut the opposite surface of the one member to prevent removal of the anchor from the hole. At least one stopper member is positioned relative to the shaft to cooperate with an inner edge of the hole to maintain a desired position of the shaft laterally relative to the hole. The fins have respective projections dimensioned such that, when the fins have passed through the hole, the projections extend into the hole and cooperate with the inner edge thereof to maintain the desired lateral position. The stopper member and the projections are located at different, non-overlapping positions relative to the shaft.

20 Claims, 1 Drawing Sheet

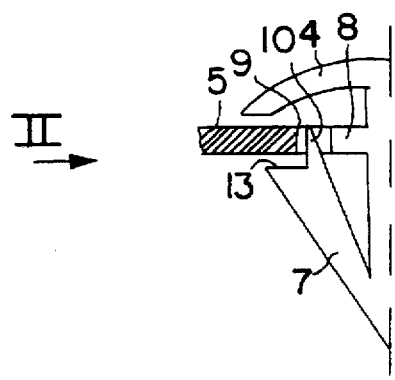
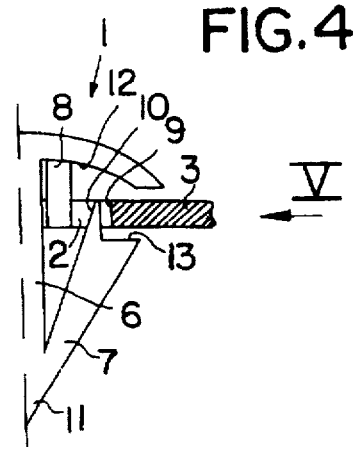
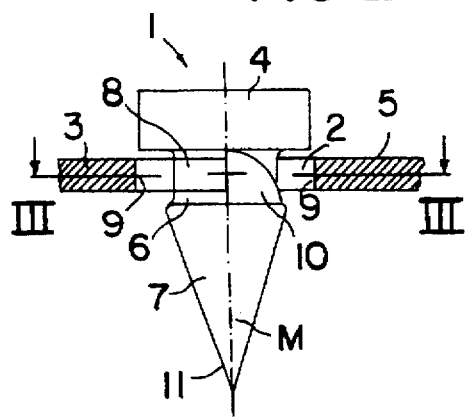
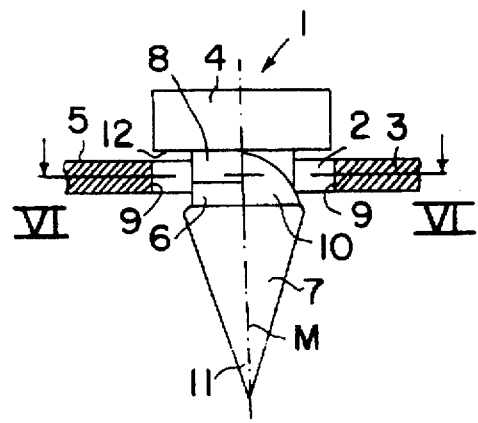
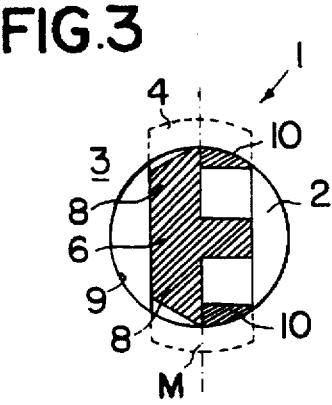
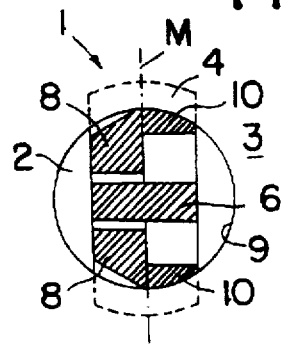

EXPANSION ANCHOR WITH POSITIONING PROJECTION AND STOPPER MEMBER

BACKGROUND OF THE INVENTION

The present invention relates to an expansion anchor to be anchored in a hole of one member to connect to such one member another member. The present invention more particularly relates to such an expansion anchor for fastening a cable hanger, a cable binder, a cable clamp, a holding clamp or a similar fastening device in a mounting hole of a support structure, for example a beam or plate. The expansion anchor includes an anchor head for abutting one surface of the one member, an anchor shaft extending from the anchor head to be inserted through the hole in the one member, and flexible fins or legs, for example two such fins or legs, integral with and extending from the shaft. When the shaft is inserted through the hole, the fins deflect toward the shaft, i.e. toward each other, to enable the fins to be inserted through the hole. When the fins are passed through the hole, they expand outwardly away from each other to extend over a dimension greater than the dimension of the hole. As a result, the anchor then is anchored to the one member and cannot be pulled from the hole. The anchor member further includes structure to achieve lateral positioning, for example centering, of the anchor within the hole, thereby to prevent lateral movement of the anchor shaft from a desired position, for example a middle or central position, within the mounting hole.

In a known expansion anchor of this type, stoppers extend diametrically opposite each other from the shaft in the direction of a central longitudinal plane of the anchor that extends parallel to the direction of the fins toward and away from each other. These stoppers limit the lateral movement of the anchor within the mounting hole and extend along the entire dimension of the shaft in directions perpendicular to the central longitudinal plane. However, with such known structure, when the anchor is subjected to a tensile force in combination with a slight lateral force, one of the two anchor fins can reach the area of the mounting hole such that it will pass therethrough. When this happens, the expansion anchor can become released from the hole of the support member. Another known expansion anchor provides that the expansion fins thereof are provided with flat tongue-like protrusions that extend backwardly, i.e. toward the head of the anchor, from the fin edges. In this known arrangement however, such protrusions extend along the entire dimension of the shaft and the fins in a direction transverse to the central longitudinal plane. These protrusions are for the purpose of abutting the inner edge of the hole to achieve center positioning of the anchor within the hole. As a result, the extent of expansion of the fins is limited. In this arrangement, the elasticity of the fins creates repositioning forces tending to operate against lateral shifting of the anchor shaft in the hole. These forces act in the direction of the expansion of the fins. In such arrangement, if a lateral force is imparted to the anchor that exceeds such repositioning force, in combination with a slight tensile force imparted to the anchor, then one of the two anchor fins can reach the area of the mounting hole and pass thereinto. As a result, the anchor can become released from the hole of the support member and be pulled therefrom.

SUMMARY OF THE INVENTION

It is an object of the present invention to provide an improved expansion anchor of the general type discussed above, but wherein it is possible to overcome the above and other prior art disadvantages.

It is a further object of the present invention to provide such an expansion anchor that may be securely mounted within a mounting hole of a relatively large size, and still remain securely anchored therein even when subjected to combined tensile and lateral forces.

These and other objects of the invention are achieved by the provision that the anchor includes at least one stopper member positioned relative to the anchor shaft to cooperate with an inner edge of the mounting hole to maintain a desired position of the anchor shaft laterally relative to the mounting hole, for example centrally positioned therein. Additionally however in accordance with the present invention, the anchor fins also have respective projections dimensioned to extend into the mounting hole to cooperate with the inner edge thereof to maintain the desired lateral position of the shaft within the mounting hole. The stopper member or members and the projections are located at different, non-overlapping positions relative to the shaft. Particularly, the stopper member or members and the projections are located at such different, non-overlapping positions relative to a periphery of the shaft or to a width dimension thereof that extends transverse to a central longitudinal plane of the anchor that is parallel to directions of movement of the fins toward and away from each other.

In accordance with this structural arrangement of the present invention, there is provided a new type of expansion anchor that provides not only stopper members that are employed in one type of known expansion anchor, but also provides fin projections that are provided in another type of known expansion anchor. These two types of structural features are provided in combination in the expansion anchor of the present invention in a manner such that the functioning of one does not interfere or impede the functioning of the other. This is due to the fact that such two different structures are provided at different, non-overlapping positions relative to the anchor shaft so that each structure operates to perform its function independently of the other, but at the same time enabling such two structures to function in a combined manner achieving an improved security of the expansion anchor of the invention from being unintentionally released and pulled from the mounting hole. Thus, if a tensile force and a lateral force concurrently are imparted to the expansion anchor of the present invention, the lateral force first has to overcome the repositioning force of one anchoring fin. This however will result in the corresponding stopper member abutting against the inner edge of the mounting hole, thereby preventing further lateral movement of the expansion member. During such lateral movement, the opposing anchor fin abuts the opposite inner edge of the mounting hole in the middle position of the anchor shaft under a tension imparted by its respective projection. This causes further expansion force to balance out the lateral shifting of the expansion member in the mounting hole. In this way, the anchor fin is prevented from reaching a position such that it aligns with and can pass into the mounting hole. Thus, in accordance with the present invention, the only portion of a given anchor fin that will extend into the mounting hole is the respective projection thereof. Further alignment of that particular anchor fin with the mounting hole is prevented.

In accordance with an advantageous configuration of the present invention, two stopper members extend from opposite sides of the shaft in directions parallel to the central longitudinal plane. Further advantageously, both stopper members are located on the same side of such plane, with the two anchor fin projections being located on the opposite side of the plane. In accordance with the concept of the invention, both stopper members can be positioned on one side of the plane or on opposite sides thereof, or on the same side or opposite sides of a form determined by a particular injection molding manufacturing tooling employed for manufacture of the expansion anchor of the invention. In such case, each anchor fin projection would be positioned on an opposite side of the plane with respect to the corresponding stopper member. In this manner, the manufacture of a unitary one-piece expansion anchor formed of all of its components is particularly possible in a simple manner by known plastic injection molding technology.

Preferably, the anchor fins taper conically in directions toward the central longitudinal plane, thereby facilitating introduction of the expansion anchor into a mounting hole. For the same purpose, it is advantageous if the anchor fins extend in converging directions defining an acute angle relative to one another and to a pointed end of the anchor shaft.

The expansion anchor preferably is formed of a suitable resilient elastic material, for example a plastic material, of a unitary one-piece construction of its significant elements of the anchor head, the anchor shaft, the anchor fins with projections and the stopper members. The material, dimensioning and design of a particular anchor member can be selected such that the anchor fins are deflectable or foldable toward each other against respective repositioning forces due to the resiliency of the fins when the expansion anchor is inserted into a mounting hole. Thereby, the anchor fins expand outwardly behind the support member having the mounting hole after the fins pass through such mounting hole, until the projections are positioned against the inner edge of the mounting hole under a certain tension resulting from the resiliency of the fins. That is, fins do not entirely move to their fully expanded position due to the tension of the projections against the inner edge of the mounting hole.

BRIEF DESCRIPTION OF THE DRAWINGS

Other objects, features and advantages of the present invention will be apparent from the following detailed description of preferred embodiments, with reference to the accompanying drawings, wherein:

FIG. 1 is a partial side view of an expansion anchor in accordance with one embodiment of the present invention, shown positioned in a mounting hole of a support member;

FIG. 2 is a view of the embodiment of FIG. 1 taken in the direction of II;

FIG. 3 is a transverse section along line III—III of FIG. 2; and

FIGS. 4–6 are views similar to FIGS. 1–3, but of a modified embodiment of the present invention.

DETAILED DESCRIPTION OF THE INVENTION

Each of FIGS. 1 and 4 shows the configuration of half of an expansion anchor in accordance with respective preferred embodiments of the present invention. It is to be understood that the other half of each anchor structure is the mirror image of the illustrated half. Expansion anchors 1 of this type serve to be anchored in a hole 2 of a member 3, for example a support beam or plate, for the purpose of attaching another member thereto. For example, it is possible to attach a cable hanger, a cable binder, a cable clamp, a holding clamp or similar fastening devices to member 3.

Each expansion anchor 1 includes an anchor head 4 dimensioned to abut one surface 5 of member 3. It is to be understood that, for instance, a cable hanger, cable clamp, holding clip or similar portion of an attaching device (not shown) is intended to be connected to a side of head 4 (the lower side shown in the drawings). Extending from head 4 is an anchor shaft 6. At an end of shaft 6 opposite head 4 are two anchor fins 7 that converge in a direction away from head 4. Fins 7 are deflectable toward shaft 6 and toward each other upon insertion of the fins 7 with shaft 6 into hole 2.

When fins 7 have passed through hole 2, resiliency of fins 7 causes them to expand away from shaft 6 to an expanded condition whereat the fins are abuttable at surfaces 13 against an opposite surface of member 3. Accordingly, the expansion anchor is prevented from being removed from hole 2. Fins 7 deflect toward each other and expand away from each other in directions that are parallel to a central longitudinal plane M of the anchor. It will be apparent from a consideration of FIGS. 1 and 4 that fins 7, before insertion therein into hole 2, have expanded dimensions greater than the size of hole 2. It will be understood by one of ordinary skill in the art from a consideration of the present disclosure that the dimensioning, design and material properties of the fins will be adaptable to a particular anchoring application. Preferably, the entire anchor of the present invention, including all of the components thereof, or at least the principle components thereof, is of a unitary one-piece structure formed of a suitable elastic, resilient, flexible material, particularly a plastic material.

In accordance with the present invention, each anchor fin 7 has on a free end thereof directed toward head 4 a respective flat, tongue-shaped projection 10. Particularly, projection 10 extends in a direction toward head 4 from upper edge 13 of fin 7. Projections 10 from the two fins 7 extend into opening 2 and are urged against inner edge 9 of opening 2 by the resiliency of fins 7. Thus, the resiliency of fins 7 impart tension urging projections 10 against edge 9.

As particularly will be apparent from a consideration of FIGS. 2 and 5, the projection 10 occupies only approximately half of the dimension of shaft 6 that extends perpendicular to plane M. With regard to the embodiments illustrated, shaft 6 is elongated in a width direction of the anchor perpendicular to plane M. Each projection 10 occupies only approximately half of this width dimension of shaft 6. Particularly, each projection 10 is positioned on one side of plane M.

On the other side of plane M is located a stopper member 8, 8' positioned relative to shaft 6 to cooperate with inner edge 9 to maintain a desired position of shaft 6 relative to hole 2. Particularly, in the illustrated embodiments, each anchor 1 has two stopper members 8, 8' extending generally away from each other, thereby cooperating with edge 9 to achieve centering of shaft 6 within hole 2. In the embodiment of FIGS. 1–3, stopper members 8 extend from shaft 6 in opposite directions parallel to plane M, and both stopper members 8 are positioned on the same side of plane M, with projections 10 being on the opposite side of plane M. It would however be possible in accordance with the present invention that the two stopper members 8 could be on opposite sides of plane M, with the result that the corresponding projections 10 would be on respective opposite sides of plane M. In the embodiment of FIGS. 4–6, the stopper members 8' extend from head 4 in directions parallel to shaft 6. The arrangement of stopper members 8' can be the same as that just described with regard to stopper members 8 of the embodiment of FIGS. 1–3.

Thus, in the arrangement of the illustrated embodiments, the stopper members take up only approximately half of the width dimension of shaft 6 in a direction perpendicular to plane M, and the remaining half of such width dimension is taken up by projections 10. Thereby, the stopper members and the projections are located at different, non-overlapping positions relative to shaft 6. The result is that stopper members 8, 8' and projections 10 can function independently without interfering or impairing the operation of the other. However, the two members cooperate to provide a very secure system for preventing unintentional detachment of the anchor member. It particularly is contemplated that by the illustrated arrangements it is possible to achieve a simple manufacturing operation of the expansion anchor by means of a plastic injection molding process when the stopper members 8, 8' are positioned on one side of a form separating plane determined by the particular injection molding manufacturing tooling, and the projections 10 lie on the opposite side thereof. Again however, an arrangement of switching of stoppers 8, 8' and projections 10 also is possible.

As illustrated in FIGS. 1 and 4, anchor fins 7 extend to a pointed end 11 of anchor shaft 6 and also taper conically from projections 10 to pointed end 11. Therefore, insertion of the expansion anchor 1 into the mounting hole 2 easily can be accomplished. Additionally, as shown in FIGS. 2 and 5, the anchor fins 7 are tapered conically in a direction to converge away from head 4 to plane M.

In the embodiment of FIGS. 4–6, stopper members 8' end shortly before the upper edge 13 of the anchor fin 7. It further will be apparent that the operation of anchor fins 7, and particularly the projections 10 thereof, are not impaired by the stoppers 8, 8'. In other words, anchor fins 7 are allowed to move toward and away from each other without being impaired by the presence of stopper members 8, 8'. This is because such projections and stopper members are located in the illustrated and explained different and non-overlapping positions relative to the shaft 6.

It further is apparent that various combinations of stopper members 8, 8' also are conceivable with regard to arrangement, dimensioning and design. It is only important that stopper members 8, 8' are in the necessary positions to ensure that an expansion anchor 1 mounted in the area of mounting hole 2 will achieve limitation of lateral movement of anchor shaft 6, without impairing the function of anchor shaft 6 and without impairing the function of anchor fins 7 when the operation of insertion into the mounting hole 2 occurs. It further is contemplated that for non-circular mounting holes 2 the stopper members 8, 8' would provide the additional function of prevention of twisting of the anchor members within such mounting holes.

Although the present invention has been described and illustrated with respect to preferred embodiments and features thereof, it is to be understood that various modifications and changes as would be apparent to one of ordinary skill in the art may be made to the specifically illustrated and described features without departing from the spirit and scope of the invention as encompassed by the appended claims.

We claim:

1. An expansion anchor to be anchored in a hole of one member to connect thereto another member, said expansion anchor comprising:

a head adapted to abut a surface of the one member;

a shaft extending from a side of said head and adapted to be inserted through the hole in the one member;

said shaft having extending therefrom fins that are deflectable toward said shaft upon insertion of said fins with said shaft into the hole and that are resiliently expandable away from said shaft when said fins have passed through the hole, such that said fins are adapted to abut an opposite surface of the one member to prevent removal of said anchor from the hole;

at least one stopper member positioned relative to said shaft to cooperate with an inner edge of the hole to maintain a desired position of said shaft laterally relative to the hole, said at least one stopper member being located at said side of said head;

said fins having respective projections dimensioned to, when said fins have passed through the hole, extend into the hole and adapted to cooperate with the inner edge thereof to maintain the desired lateral position; and said at least one stopper member and said projections being located at different, non-overlapping positions relative to said shaft.

2. An expansion anchor as claimed in claim 1, comprising two said fins that are resiliently deflectable toward each other and expandable away from each other.

3. An expansion anchor as claimed in claim 2, wherein said fins converge in a direction away from said head.

4. An expansion anchor as claimed in claim 3, wherein said fins extend in directions defining therebetween an acute angle.

5. An expansion anchor as claimed in claim 2, wherein said fins taper conically relative to a central longitudinal plane of said anchor that is parallel to directions of movement of said fins toward and away from each other.

6. An expansion anchor as claimed in claim 1, wherein said fins extend to and join a pointed end of said shaft opposite said head.

7. An expansion anchor as claimed in claim 1, wherein said at least one stopper member extends laterally from said shaft.

8. An expansion anchor as claimed in claim 1, wherein said at least one stopper member extends from said head parallel to said shaft.

9. An expansion anchor as claimed in claim 1, comprising two said stopper members.

10. An expansion anchor as claimed in claim 9, wherein said two stopper members are located opposite each other relative to said shaft on the same side of a central longitudinal plane of said anchor that is parallel to directions of movement of said fins toward and away from each other.

11. An expansion anchor as claimed in claim 10, wherein said projections are located on an opposite side of said plane.

12. An expansion anchor as claimed in claim 10, wherein said two stopper members extend in opposite directions parallel to said plane.

13. An expansion anchor as claimed in claim 9, wherein said shaft is elongated in a width direction extending perpendicular to a central longitudinal plane of said anchor that is parallel to directions of movement of said fins toward and away from each other.

14. An expansion anchor as claimed in claim 13, wherein said two stopper members are located on one side of said plane and said projections are located on an opposite side of said plane.

15. An expansion anchor as claimed in claim 1, wherein each said fin has an end surface that is opposite said shaft and that is adapted to abut the opposite surface of the one member, and the respective said projection extends from said end surface.

16. An expansion anchor as claimed in claim 15, wherein said end surface and said projection define therebetween a step.

17. An expansion anchor as claimed in claim 1, wherein said projections are dimensioned to be urged against the inner edge of the hole as a result of the resiliency of said fins.

18. An expansion anchor as claimed in claim 1, wherein said head, said shaft, said fins, said projections and said at least one stopper member are formed as a unitary one-piece structure.

19. An expansion anchor as claimed in claim 18, wherein said structure is formed of plastic.

20. An expansion anchor as claimed in claim 1, wherein said shaft has a longitudinal axis, and said at least one stopper member and said projections are located at said different, non-overlapping positions relative to said shaft in a direction around said axis.

* * * * *